Feb. 15, 1966   M. B. HOLLANDER   3,235,157
FRICTION WELDING

Filed Oct. 2, 1963

INVENTOR
MILTON BERNARD HOLLANDER
BY

ATTORNEY

Feb. 15, 1966    M. B. HOLLANDER    3,235,157
FRICTION WELDING
Filed Oct. 2, 1963    3 Sheets-Sheet 2
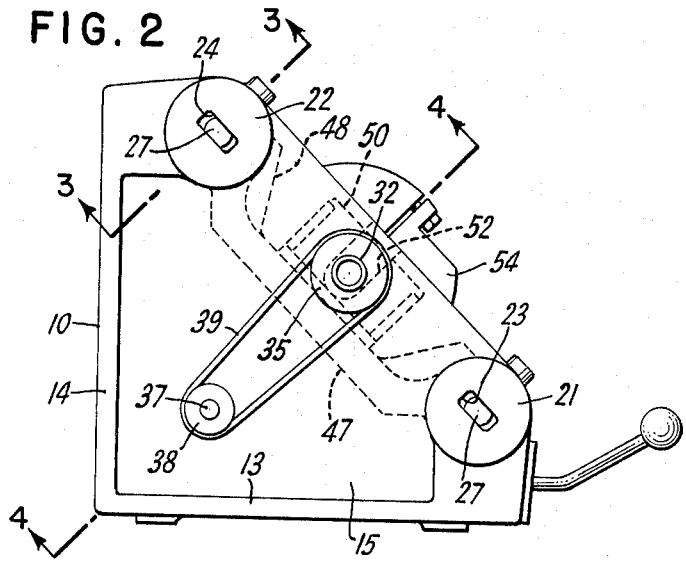
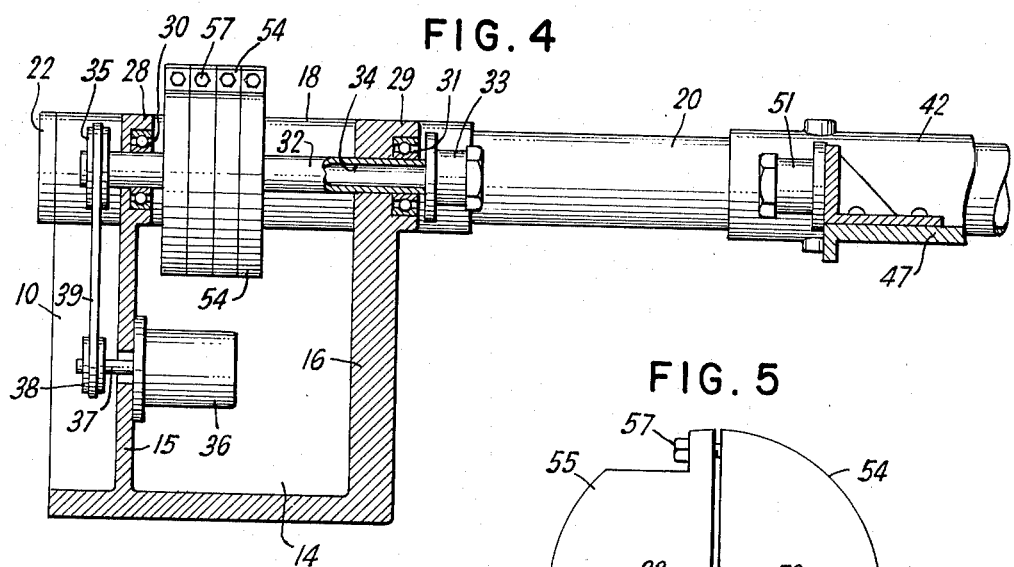
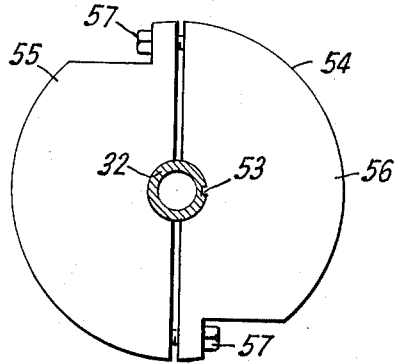
INVENTOR
MILTON BERNARD HOLLANDER
BY
ATTORNEY

United States Patent Office 3,235,157
Patented Feb. 15, 1966

3,235,157
FRICTION WELDING
Milton Bernard Hollander, Stamford, Conn., assignor to American Machine & Foundry Company, a corporation of New Jersey
Filed Oct. 2, 1963, Ser. No. 313,329
8 Claims. (Cl. 228—2)

This application is a continuation-in-part of co-pending cases Serial No. 833,339, now Patent No. 3,134,278 and 206,714.

This invention relates in general to welding and, more particularly, to friction welding machines operated by air motors.

An object of this invention is to provide a friction welding apparatus which is more flexible in its use in that it is lighter and more compact so that it may be more easily set up and used while occupying less floor space in a wider variety of productive locations than known devices.

Another object of this invention is to provide a less expensive and more easily manufactured friction welding machine which may be easily adapted to weld a wide variety of workpieces.

Yet another object of this invention is to provide a more versatile production friction welding machine.

Still another object of this invention is to provide a friction welding apparatus driven by a pneumatic motor having torque characteristics which permit a faster cycle in an inertia friction welding apparatus.

A further object of this invention is to provide a production friction welding apparatus which is completely air operated and requires no external connections to electric or hydraulic power lines.

Another object of this invention is to provide a friction welder which operates in either a vertical or horizontal position.

Another object of this invention is to provide a portable friction welding machine which can be operated in the field from an air compressor or any air pressure source.

Many other objects, advantages and features of invention reside in the particular construction, combination and arrangement of parts involved in the embodiment of this invention and its practice as will be understood from the following description and accompanying drawing wherein:

FIGURE 2 is an end view of the headstock end of the friction welding apparatus;

FIGURE 4 is a longitudinal section taken on line 4—4 of FIGURE 2 through a fragment of the friction welding apparatus;

FIGURE 5 is a transverse section through the arbor of the friction welding apparatus showing a flywheel mounted thereon;

Figure 1:
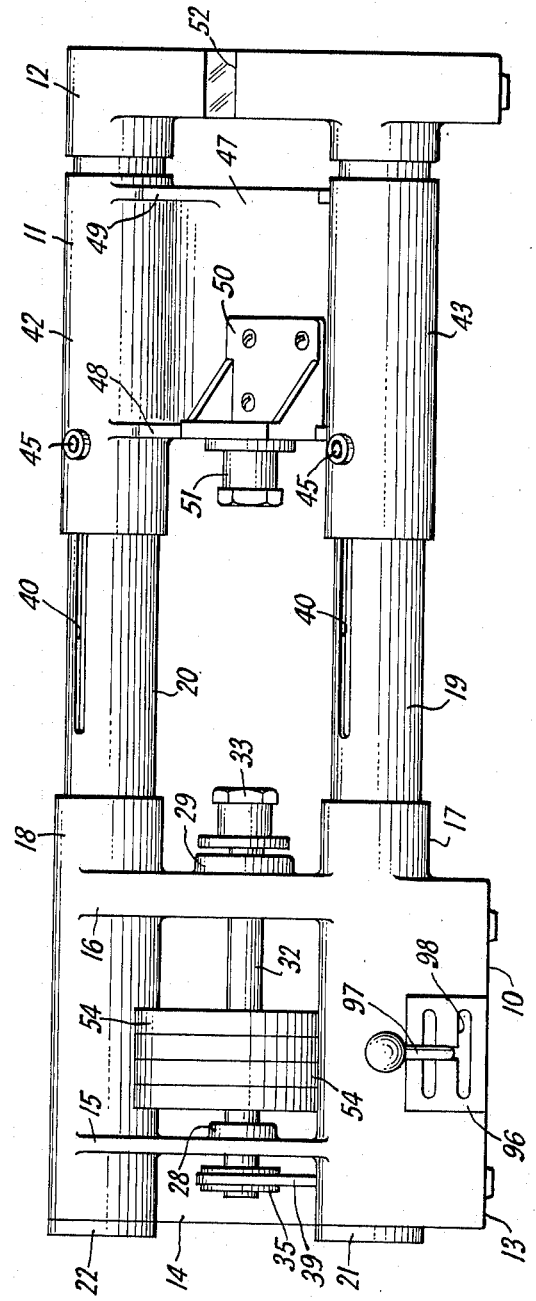
FIGURE 1 is a side view of the friction welding apparatus of this invention.

Referring to the drawing in detail, FIGURE 1 shows the three main portions of this apparatus which are the headstock 10, the slidably mounted tailstock 11, and the foot 12. These elements are preferably made from lightweight aluminum castings which are machined in critical locations to required dimensions.

Figure 3:
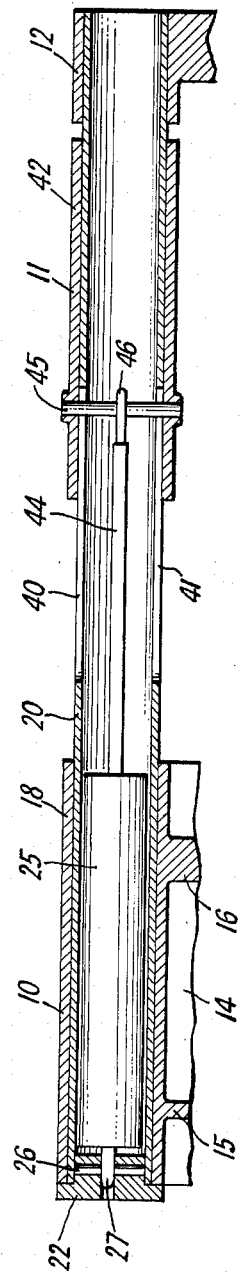
FIGURE 3 is a longitudinal section taken on line 3—3 of FIGURE 2 through a fragment of the friction welding apparatus.

As shown in FIGURES 1–4, the headstock 10 has a horizontal bottom wall 13 and a vertical back wall 14 connected by vertical front and rear flanges 15 and 16. Integrally connected with the front edge of the bottom wall 13 and the top edge of the back wall 14 are the cylindrical portions 17 and 18. The tubular guides 19 and 20 are fixed in the cylindrical portions 17 and 18. The end caps 21 and 22 extend over and enclose the open ends of the cylindrical portions 17 and 18 and the tubular guides 19 and 20. Square channels 23 and 24 extend longitudinally through the end caps 21 and 22. A hydraulically activated tension cylinder 25 is disposed within the headstock end of each tubular guide 19 and 20 and fixed to one of the end caps 21 or 22 by a transverse pin 26, as shown in FIGURE 3, which transfixes a projection 27 extending from each cylinder 25.

Bosses 28 and 29 in the flanges 15 and 16 house bearings 30 and 31 which rotatably support the arbor 32 midway between the tubular guides 19 and 20. The upper portion of flange 16 is cast into a reinforced shape to take thrust loads. Bearing 31 should be a thrust bearing to take the axial load borne by arbor 32 during the making of a friction weld. The front end of arbor 32 carries a chuck 33 of the collet type. A hole 34 extends longitudinally through arbor 32 so that workpieces may be loaded through it. A V-belt pulley 35 is fixed to the rear end of arbor 32. A pneumatic motor 36 of the vane or piston type is bolted or otherwise secured to the rearmost flange 15. The shaft 37 of motor 36 extends through flange 15 and has a V-belt pulley 38 fixed to it. A belt 39 extends about the pulleys 35 and 38 so that motor 36 may rotate arbor 32.

As shown in FIGURES 1, 3 and 4, the guide tubes 19 and 20 each have an upper and lower longitudinal slot 40 and 41 formed in them. The tailstock 11 is slidably disposed about the tubular guides 19 and 20 with a part of its two cylindrical portions 42 and 43 disposed over the slots 40 and 41. Each hydraulically activated tension cylinder 25 has a piston rod 44 which is linked to the tailstock 11 by a transverse pin 45 which transfixes an end piece 46 of each rod 44 and is fixed in a cylindrical portion of tailstock 11. The transverse pins 45 also extend through the slots 40 and 41 to control their longitudinal motion along the tubular guides 19 and 20. Thus the activation of cylinders 25 to withdraw rods 44 will draw the tailstock 11 toward the headstock 10.

Tailstock 11 has a bottom wall 47 which joins the lower portions of its cylindrical portions 42 and 43. Suitable flanges 48 and 49 reinforce the bottom wall 47. A chuck holding fixture 50 may be bolted or otherwise fixed to the bottom wall 47 to hold a chuck 51 on tailstock 11.

The foot 12 positions and supports the ends of the tubular guides 19 and 20. It contains a large notch 52 so that long workpieces may be loaded from behind into chuck 51.

As shown in FIGURES 1, 4 and 5, arbor 32 contains a keyway type slot 53. Flywheels 54 are each made in two parts 55 and 56 which are clamped together about arbor 32 by bolts 57. Thus a selected number of flywheels 54 may be clamped in place about arbor 32 to engage slot 53 and provide the required rotational inertia or energy to complete a given friction weld.

Figure 7:
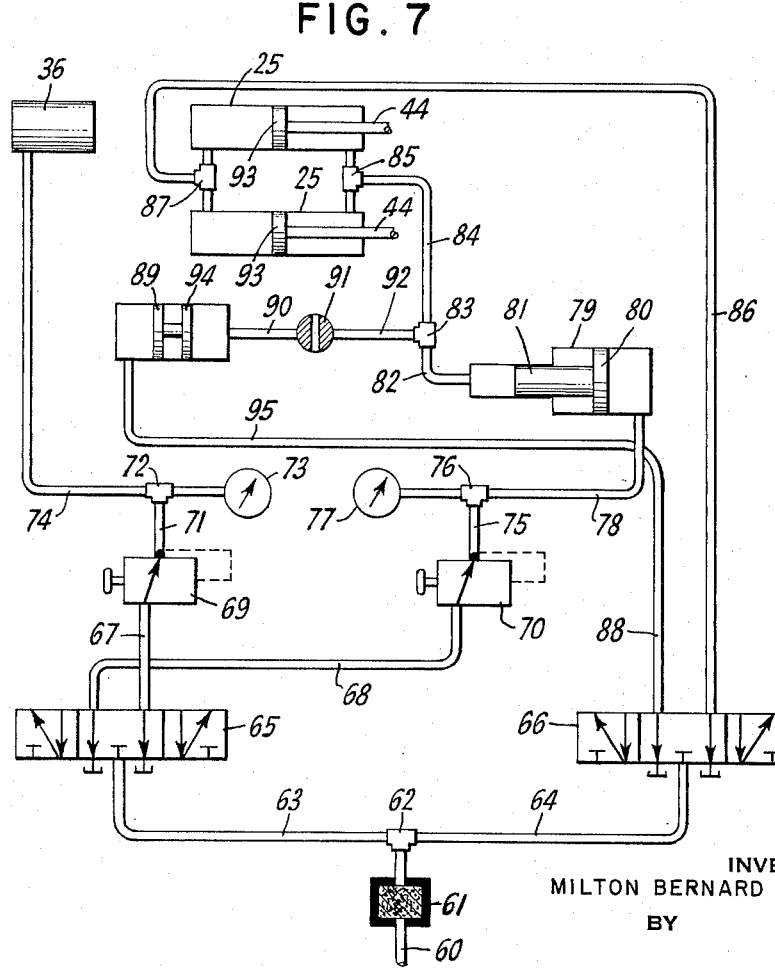
FIGURE 7 is a schematic diagram of the pneumatic and hydraulic elements and their associated circuitry which activate and control the friction welding apparatus of this invention.

Referring now to FIGURE 7, air under pressure flows into pipe 60 and through a filter 61. This air passes through a T-joint 62 to flow through pipes 63 and 64 to the four-way valves 65 and 66. Two pipes 67 and 68 lead from valve 65 to the pressure regulating valves 69 and 70. Air flows from the pressure regulating valve 69 through pipe 71 to the T-joint 72 which is connected to the pressure gauge 73 and pipe 74 which leads to the pneumatic motor 36.

Pipe 75 leads to the T-joint 76 to which is connected the pressure gauge 77 and the pipe 78 leading to the pressure booster 79. Booster 79 has a large area piston 80 which is directly coupled to a small area high pressure hydraulic piston 81. This enables air pressure on piston 80 to produce a high hydraulic pressure with piston 81. Pipe 82 leads from booster 79 to the T-fitting 83 which is connected by pipe 84 to the T-fitting 85 which, in turn, is connected to the hydraulic side of the hydraulically activated tension cylinders 25.

Shop air flows through pipe 86 which leads from valve 66 to a T-fitting 87 which is connected to the other end of cylinders 25. Pipe 88 leads from valve 66 to the air-oil pump 89 which may exert a low hydraulic pressure on oil which flows through pipe 90 to the two-way valve 91. Pipe 92 leads from valve 91 to the T-fitting 83.

The valves 65, 66 and 91 may be activated in the following manner to accomplish a friction weld with the machine of this invention. As shown in FIGURES 1, 3, 4 and 7, valve 91 is opened allowing hydraulic fluid to pass from pipe 90 to pipe 92. Valve 66 may then be manipulated to direct air through pipe 86 to move the pistons 93 of cylinders 25 forward to extend the piston rods 44 and move the tailstock 11 away from the headstock 10. As the pistons 93 move forward, hydraulic fluid is expelled from cylinders 25 and flows through T-fitting 85 and pipe 84 to urge pistons 80 and 81 to the right as shown and to move the pistons 94 of air-oil pump or accumulator 89 to the left. Air expelled from air-oil pump 89 flows through pipe 95 which is then vented to the atmosphere by valve 66. Workpieces may now be easily placed in the separated chucks 33 and 51. Valve 66 is then activated to direct air through pipe 88 which causes air-oil pump 89 to force hydraulic fluid under low pressure through pipe 90, valve 91, pipe 92, T-fitting 83, pipe 84 and T-fitting 85 to move pistons 93 to the left as shown in FIGURE 7. As pistons 93 move to the left, air is exhausted from cylinders 25 through T-fitting 87 and pipe 86 to valve 66 which is then venting pipe 86 to the atmosphere. When the tailstock 11 positions the workpieces a desired distance apart, valve 66 is placed in its central position venting both pipes 88 and 86 to the atmosphere and valve 91 is closed. Valve 65 may then be activated to direct air through the pressure reducing valve 69, pipe 71, T-fitting 72 and pipe 74 to the motor 36. Gauge 73 may be calibrated to read in revolutions per minute of arbor 32 rather than in pounds per square inch of air pressure. Thus motor 36 is brought up to a desired speed, rotating arbor 32, flywheels 54, and a workpiece, to make a given friction weld.

Valve 65 is then activated to pass air through pipe 68 to pressure reducing valve 70, pipe 75, T-fitting 76 and the booster 79. Booster 79 forces hydraulic fluid through pipe 82, T-fitting 83, pipe 84 and T-fitting 85 into the cylinders 25 to cause them to retract piston rods 44 and force a rapidly rotating workpiece against a stationary workpiece. The inertia in the rotating workpiece, chuck 33, arbor 32, the flywheels 54 and the other rotating elements will deliver energy to the weld area which is the area of contact between the workpieces to accomplish a friction weld. Thus the friction welding machine of this invention may make a friction weld while being connected to only a single source of shop air.

If it is desired, gauge 77 may be calibrated to read directly in pounds of force urging the workpieces together while making a weld rather than in pounds per square inch as given pressures result in predictable forces being exerted by the booster 79 and the cylinders 25. Thus two parameters for making a particular weld may be set directly by adjusting valves 69 and 70 while reading gauges 73 and 77 to provide a desired speed of rotation between the workpieces and a desired welding force.

Figure 6:
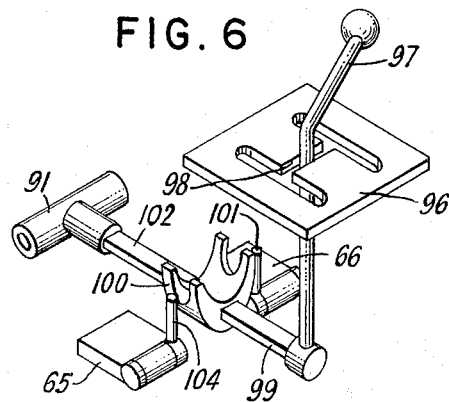
FIGURE 6 is a perspective view of a control lever, three associated control valves, and associated mechanisms for operating the friction welding apparatus of this invention with one control lever.

Referring now to FIGURE 6, a single control lever 97 may project through an H-slot 98 in a plate 96 to control this friction welding apparatus. Lever 97 rotates the square hollow shaft 99 and thereby the double yoke 100. When lever 97 is moved to the right, yoke 100 engages an operating handle 101 extending from valve 66. When lever 97 is then moved forward or backward, it activates valve 66 in the manner which has been described to move the tailstock forward and backward on the friction welding apparatus. When lever 97 is moved to the right rotating shaft 99 to the right, shaft 99 rotates the smaller shaft 102 telescoped within it. This rotation of shaft 102 opens the hydraulic two-way valve 91 so that the tailstock may move in the manner which has been described.

When lever 97 is moved to the left, it rotates shaft 99 and thereby shaft 102 to close valve 91. Yoke 100 then engages an operating lever 104 of valve 65 so that the backward and forward motion of lever 97 will slide yoke 100 to move lever 104 and activate the four-way valve 65 in the manner which has been described to bring motor 36 to a desired speed and then activate the booster 79 to complete a friction weld. The control lever 97 and plate 96 may be mounted in any desired location on or adjacent to the welding machine.

This invention enjoys many advantages. A conventional pneumatic motor delivers its highest torque at its lowest speed. Thus a pneumatic motor is particularly effective to accelerate the arbor and the flywheels 54 from a position of rest. Further, a pneumatic type motor may be stalled without harm so that, in some friction welding applications, the motor need not be shut off when making a weld but it may just be allowed to stall. In addition the use of a pneumatic motor and a pneumatic booster is particularly desirable in a friction welding apparatus in that only two pressure reducing valves 69 and 70 need be provided as control elements to set the apparatus to make a wide variety of welds. Flywheels 54 may be added or removed from arbor 32 depending upon the inertia requirements of a given weld.

The use of a booster 79 is possible in a friction welding machine because the high pressure requirements of the hydraulic system involve a small flow of hydraulic fluid as the tailstock need only move a small distance while making a weld. Thus, by means of a booster 79, shop air at about 100 pounds per square inch provides enough hydraulic pressure to weld steel and titanium workpieces and the like in this apparatus. The pump or accumulator 89 allows low pressure air or hydraulic fluid to move the pistons 93 and thereby move the tailstock 11 into a welding position rapidly. The application of this low pressure is sufficient to cause the piston 81 to return to the right as shown in FIGURE 7 to be in position for the next welding cycle.

The tubular guides 19 and 20 and the arbor 32 are in a plane which is inclined at 45 degrees to the front of the machine so that an operator has ready access to the chucks 33 and 51. While manual chucks are shown, any suitable automatic chuck may be used in a production machine. The inclination of the basic machine elements also facilitates the loading of elongated workpieces which may extend through arbor 32 and notch 52 in foot 12. In some applications, it may be desirable to use this friction welding apparatus as a vertical machine. In this case, the machine may be stood upon either the foot 12 or the headstock 10.

While this invention has been shown and described in the best form known, it will nevertheless be understood that modifications may be made in the construction, combination and arrangement of parts without departing from the spirit and scope of the invention except as it may be more limited in the appended claims.

What is claimed is:

1. An inertia friction welding machine comprising, in combination, a headstock, tubular guides extending from said headstock, each of said guides containing longitudinal slots, an arbor rotatably mounted in said headstock between said tubular guides, a workpiece holding chuck mounted on said arbor, flywheels mounted on said arbor, motor means rotating said arbor with said flywheels and said workpiece holding chuck, a tailstock slidably mounted on said tubular guides, said tailstock having at least a portion extending over the slots in said tubular guides, transverse pins extending through said tailstock and through the slots in said tubular guides, and a cylinder within each of said tubular guides, said cylinders each having one end attached to said tubular guides and the other end attached to one of said transverse pins.

2. An inertia friction welding machine comprising, in combination, a headstock, tubular guides extending into and fixed to said headstock, said tubular guides each containing longitudinal slots disposed beyond said headstock, an arbor rotatably mounted in said headstock between said tubular guides, a first workpiece holding chuck mounted on said arbor, flywheels mounted on said arbor, a pneumatic motor mounted on said headstock, drive means enabling said motor to rotate said arbor, a tailstock slidably mounted on said tubular guides, said tailstock having at least a portion extending over the slots in said tubular guides, a second workpiece holding chuck mounted on said tailstock between said tubular guides, transverse pins extending through said tailstock and through the slots in said tubular guides, and a hydraulic tension cylinder within each of said tubular guides, said cylinders each having an end attached to the headstock end of one of said tubular guides and having a piston rod extending from each of said cylinders, each of said piston rods being attached to one of said transverse pins.

3. The combination according to claim 2 with the addition of a foot disposed beyond said tailstock to which said tubular guides are attached.

4. The combination according to claim 3 wherein said tubular guides, said arbor, and said workpiece holding chucks are disposed in a plane inclined at about 45 degrees to the front of the friction welding machine.

5. The combination according to claim 2 wherein hydraulic fluid pressure retracts said piston rods into said cylinders and pneumatic pressure extends said piston rods from said cylinders and with the addition of a source of air under pressure, a first four-way valve connected to said said source of air under pressure, a second four-way valve connected to said source of air under pressure, pipe means leading from said first four-way valve to said pneumatic motor, a pneumatically activated pressure booster, pipe means connecting said first four-way valve to said booster, hydraulic lines leading from said booster to said cylinders, an air activated hydraulic fluid accumulator, a two-way hydraulic valve connected between said accumulator and said hydraulic lines leading from said booster to said cylinders, pipe means conducting air under pressure from said second four-way valve to said cylinders, and pipe means leading from said second four-way valve to said accumulator.

6. The combination according to claim 5 with the addition of regulating valves connected between said first four-way valve and said motor and connected between said first four-way valve and said booster, said regulating valves regulating the speed of said motor and the force exerted by said cylinders drawing said tailstock toward said headstock.

7. The combination according to claim 5 wherein said four-way valves each have an operating lever extending upward therefrom and with the addition of a first shaft extending from said two-way valve, a second shaft slidably connected to rotate with said shaft extending from said two-way valve, a control lever extending upward from said second shaft, a plate containing an "H" slot through which said control lever extends, said "H" slot being disposed parallel to said second shaft, and a double yoke fixed to said second shaft, movement of said control lever to one side causing said double yoke to engage an operating lever of one of said four-way valves and the forward and reverse motion of said control lever causing said yoke to move the engaged operating lever of one of said four-way valves.

8. In an inertia friction welding machine having a headstock, a slidably mounted tailstock, an arbor mounted in said headstock, a pneumatic motor driving said arbor, and at least one hydraulic tension cylinder having piston rods activated by hydraulic pressure to move said tailstock toward said headstock and activated by pneumatic pressure to move said tailstock away from said headstock; a source of shop air, a first four-way valve connected to said source of shop air, a second four-way valve connected to said source of shop air, pipe means leading from said first four-way valve to said pneumatic motor, a pneumatically activated hydraulic pressure booster, pipe means connecting said first four-way valve to said booster, hydraulic lines leading from said booster to said at least one cylinder, an air activated hydraulic fluid accumulator, a two-way hydraulic valve connected between said accumulator and said hydraulic lines leading from said booster to said at least one cylinder, pipe means conducting air under pressure from said second four-way valve to said at least one cylinder, and pipe means leading from said second four-way valve to said accumulator.

References Cited by the Examiner

UNITED STATES PATENTS

| | | | |
|---|---|---|---|
| 699,547 | 5/1902 | Merritt | 144—209 |
| 1,891,220 | 11/1932 | Bath | 82—28 |
| 2,150,032 | 3/1939 | Herman et al. | 82—28 |
| 2,612,071 | 9/1952 | Kurzwell | 82—28 |
| 3,134,278 | 5/1964 | Hollander et al. | 228—2 |

WHITMORE A. WILTZ, *Primary Examiner.*

M. L. FAIGUS, *Assistant Examiner.*